March 18, 1969  M. M. E. VAN SCHOIACK  3,434,050

HIGH IMPEDANCE MEASURING APPARATUS

Filed April 25, 1966

INVENTOR.
MICHAEL M. E. VAN SCHOIACK

BY Bruce C Lutz

ATTORNEY

United States Patent Office 3,434,050
Patented Mar. 18, 1969

3,434,050
HIGH IMPEDANCE MEASURING APPARATUS
Michael M. E. Van Schoiack, Anoka, Minn., assignor, by mesne assignments, to the United States of America as represented by the Administrator of the National Aeronautics and Space Administration
Filed Apr. 25, 1966, Ser. No. 544,899
U.S. Cl. 324—57                                    3 Claims
Int. Cl. G01r 27/08; G05f 1/40, 1/60

ABSTRACT OF THE DISCLOSURE

A high impedance measuring apparatus comprising a power supply which supplies an output current to a load impedance. The current through the load is conducted through a sensing means to create a voltage which is measured by measurement indication means to indicate load impedance. The sensing means also provides a signal proportional to the current therethrough which is fed to an isolating means series-connected to a comparison means where it is compared with a reference signal. The comparison means produces an error control signal corresponding to the difference between the apparatus output current and the desired output current. The error control signal is fed to a regulating means which alters the output current by varying its internal impedance so that the voltage which appears across the controlled supply means and at the output terminals of the apparatus either increases or decreases in accordance with the need for more or less current.

---

The invention described herein was made in performance of work under a NASA contract and is subject to the provisions of Section 305 of the National Aeronautics and Space Act of 1958, Public Law 85–568 (72 Stat. 435; 42 USC 2457).

This invention relates generally to measurement apparatus and more particularly to high impedance measurement apparatus.

In the prior art, high impedance has been measured by applying a known voltage to a load and measuring the resultant current. A well regulated power supply is used to provide the known voltage, and an ammeter, calibrated in units of resistance, measures the current. There is a basic limitation on this type of measuring apparatus in that it does not limit current except through its internal impedance. This means that when the circuit is used to measure insulation impedance, for example, and a fault is found, the current resulting may damage one or more parts in the current path between the measuring apparatus and the fault. The same limitation appears when this apparatus is used to measure breakdown voltage, of transistors for example. When the breakdown point is reached, an excessive current will be put through the device being tested.

The present invention overcomes these limitations by making a fundamental change in the technique of measurement. The present invention electronically controls the output current to a preset value and measures the resulting voltage across the output terminals to arrive at a resistance value instead of limiting the voltage to a known value and measuring the resultant current as in the prior art. Because the current is electronically controlled to a very low value, damage to the parts in the current path between the present invention and an insulation fault may be averted, when the invention is used as an insulation tester; and, when the device is being used to measure breakdown voltage, damage to a device or part undergoing a breakdown test is also averted in the same way.

It is an object of this invention to measure impedance by applying an electronically controlled current to an impedance and measuring the resultant voltage.

Further objects and advantages will become apparent from a reading of the specification and claims in conjunction with the drawings wherein:

Figure 1:
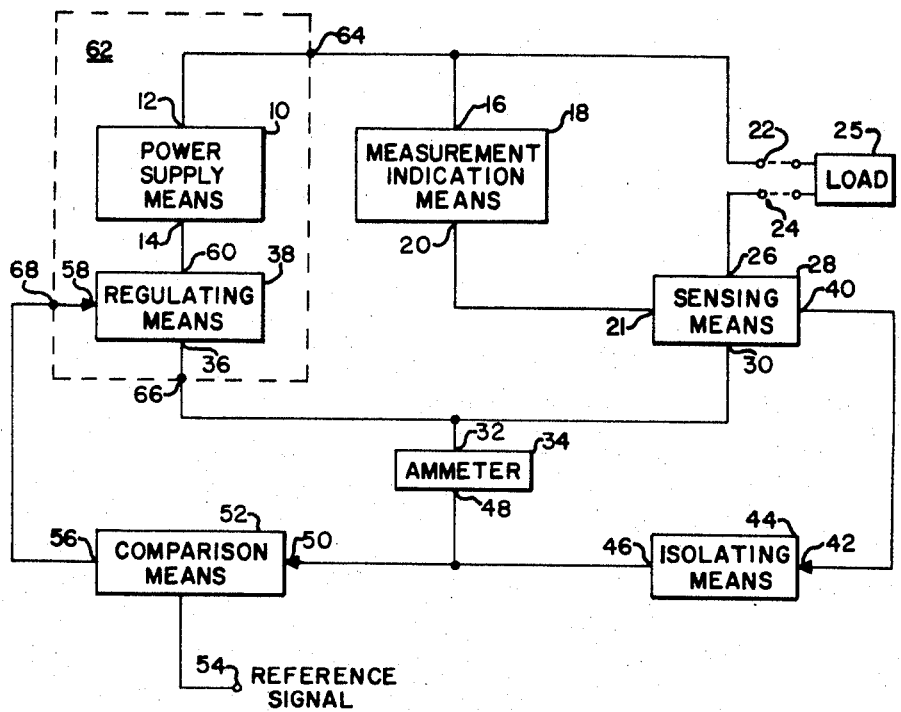
FIGURE 1 is a block diagram of the preferred embodiment of this invention.

FIGURE 1 shows a power supply means 10 with voltage supply output means 12 and 14. Output 12 of power supply means 10 is connected to an input means 16 of a measurement indication means or voltmeter 18 and to a high impedance apparatus output means or measurement output terminal 22. Another input means 20 of measurement indication means 18 is connected to an input means 21 of a sensing means 28. Another high impedance apparatus output means 24 is connected to another input means 26 of sensing means 28. Apparatus output means 22 and 24 are adapted to be connected to a load means 25 as shown. An output means 30 of sensing means 28 is connected to an input means 32 of an ammeter 34 and to a regulating output means 36 of a regulating means 38. Another output means 40 of sensing means 28 is connected to an input means 42 of an isolating means 44. Isolating means 44 insures that all but a small proportion of the current flowing from apparatus output means 24 flows through sensing means 28 and not through the control path which follows isolating means 44. As will be realized by those skilled in the art, the isolating means may not be needed, depending on the application. An output means 46 of isolating means 44 is connected to an input 48 of ammeter 34 and to an input means 50 of a comparison means or differential amplifier 52. Comparison means 52 has a reference signal input means 54. An output means 56 of comparison means 52 is connected to a control input means 58 of regulating means 38. Regulating means 38 has another regulating output means 60 which is connected to voltage supply output means 14 of power supply means 10. A block or controlled supply means generally designated as 62, indicated by the dash line, includes power supply means 10 with its outputs, 12 and 14, and regulating means 38 with its outputs, 60 and 36, and its input, 58. Block 62 has an output 64 which is connected to output 12 of power supply means 10, and output 66 which is connected to output 36 of regulating means 38, and an input 68 which is connected to input 58 of regulating means 38.

Figure 2:
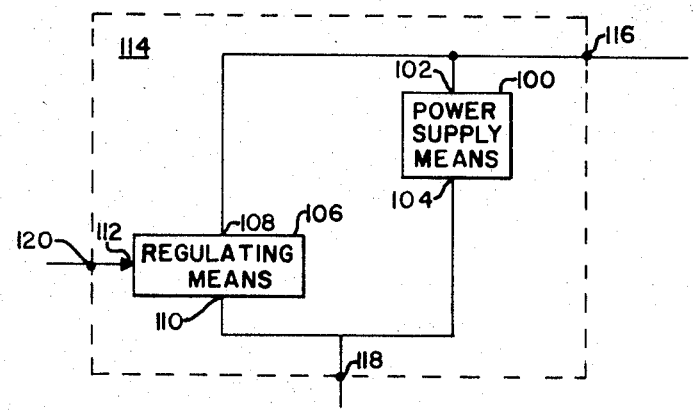
FIGURE 2 is an alternate means of effecting the result of the circuitry within the dashed lines in FIGURE 1.

FIGURE 2 shows a power supply means 100, with output means 102 and 104, and a regulating means 106, with output means 108 and 110 and an input means 112. Output means 102 and 108 are connected together as are output means 104 and 110. A block or controlled supply means 114 comprises the entire FIGURE 2 and is indicated by dashed lines. An output 116 of block 114 is connected to output means 102. An output 118 of block 114 is connected to output means 104 while an input 120 of block 114 is connected to an input means 112.

The operation of this invention will now be discussed with reference to FIGURE 1. The apparatus shown provides an electronically controlled preset level of current to a load and measures the resultant voltage across the load to determine the load impedance. The electronic control of the output current is achieved by sensing the output current and feeding the sensed signal back to alter the controlled supply means such that the preset level of current is maintained. The power supply, 10, provides an output current to apparatus output means 22. The output current flow from apparatus output means 22 to load 26 and back to apparatus output means 24. The output current returning from load 26 through apparatus output means 24 is then conducted to sensing means 28, through regulating means 38, and then back to power supply 10. This current flowing through load 26 and sensing means 28 creates a voltage which is measured by measurement indication means 18 to give an indication of the load impedance. This may be accomplished in some embodiments by calibrating indication means 18 in units of resistance or impedance. It will be realized by those skilled in the art that there are two sources of error inherent in the attachment of the measurement indication means: (1) If current from the measurement indication means flows through the sensing means, an error in the amount of current flowing through the load will result. (2) If a volt drop due to the current sensing means is included in the voltage measurement taken to indicate the impedance of the load, an error in the impedance measured will result. Either error may be compensated for by techniques well known to those skilled in the art. The output current flowing through sensing means 28 provides a signal, proportional to itself, which is conducted from output 40 of sensing means 28 to isolation means 44, which provides a high impedance input. The signal proportional to the output current is then used by ammeter 34 to provide an indication of the output current. If the circuit is precalibrated, an ammeter is not necessary unless constant monitoring of current is desired. The signal proportional to the output current is also conducted to comparison means 52 where it is compared with a reference signal entering at reference signal input 54. The signal which appears at output 56 of comparison means 52 indicates the difference between the output current and the desired output current. The desired level of output current is controlled by the reference. This signal at output 56 is then conducted to input 58 of regulating means 38. Since regulating means 38 is in series with the current path, it can alter the output current flowing by an action similar to increasing its internal impedance. The net result is the voltage which appears across terminals 66 and 64 either increases in response to a signal indicating a need for more current or decreases in response to a signal indicating a need for less current. This increase or decrease in voltage is reflected directly across apparatus output means 22 and 24. Therefore, the sensed current is used to provide an error signal which in turn controls the voltage appearing at the apparatus output terminal to whatever level is necessary to maintain the preset level of output current.

FIGURE 2 is an alternate method of generating the voltage necessary to provide the fixed level of output current. Block 114 may be substituted directly for block 62 of FIGURE 1 such that: terminal 118 is substituted for terminal 66; terminal 116 is substituted for terminal 64, and terminal 120 is substituted for terminal 68. The circuitry of block 62 in FIGURE 1 is a series regulator while block 114 of FIGURE 2 is a parallel regulator achieving the same results. The power supply means, 100, of FIGURE 2 provides an output current in the same manner as the power supply, 10, of FIGURE 1. However, where the regulating means, 38, of FIGURE 1 uses an action similar to that of increasing its internal impedance in order to increase the loop impedance and thereby reduce the loop current, the regulating means, 106, of FIGURE 2 uses an action similar to that of reducing its internal impedance such that it draws more current from the power supply means, 100, through itself and allows less to flow from terminal 116 to terminal 118, in order to achieve the same result.

In describing and explaining the workings of this invention, functional blocks have been used. All of these blocks are familiar to those skilled in the art. For example, the power supply may consist of anything from a battery to a regulated or unregulated power supply deriving its power from an alternating power source; the regulating means normally would comprise one or more tubes or transistors but could be any form of electronic or nonelectronic type of regulator; the comparison means may be a differential amplifier; the isolation means usually will be an amplifier comprising one or more tubes or transistors such as a FET; the sensing means will usually be a resistance means but may take other forms; the voltmeter and ammeter are well known to those skilled in the art. It will also be obvious to those skilled in the art that power supplies which are not shown may be necessary to provide power to some of the blocks.

I claim:
1. High impedance measurement apparatus comprising, in combination:
controlled supply means for supplying an output current which is electronically controlled so as to maintain a preset level of output current;
said controlled supply means comprising a voltage supply means in electrical series with a regulating means, a voltage supply output means, a regulating output means, and a control input means, and said regulating means electronically controlling the output current to maintain a preset level through an action similar to a voltage dropping action;
sensing means for sensing the output current and providing a signal proportional to the output current;
connecting means connecting said sensing means to said controlled supply means, the signal proportional to the output current electronically controlling said controlled supply means;
said connecting means comprising isolation means in the connection between said sensing means and said controlled supply means, comparison means in electrical series connection with said isolation means and including a comparison reference signal input and a reference signal means, said isolation means providing isolation between said sensing means and said comparison means and limiting the current through said connecting means, said comparison means comparing the signal from said isolation means with a reference signal inserted through said reference signal input to form an error signal proportional to the difference between the desired level of output current and the existing level of output current, said comparison means connecting to said control input means in order to electronically control the regulating means, and means connecting said sensing means to said regulating output means;
high impedance measurement apparatus output means connected to said sensing means and to said voltage supply output means of said controlled supply means, said impedance measurement apparatus output means being adapted to be connected to a load; and
measurement indication means connected to said sensing means and said voltage supply output means of said controlled supply means for providing an impedance indication of the load where the output current is electronically controlled to a preset level.

2. High impedance measurement apparatus comprising, in combination:
controlled supply means for supplying an output current which is electronically controlled so as to maintain a preset level of output current;
said controlled supply means comprising a voltage supply means in electrical connection with a regulating means, a voltage supply output means, a regulating output means, and a control input means, and said regulating means electronically controlling the output current to maintain a preset level of current;
sensing means for sensing the output current and providing a signal proportional to the output current;
connecting means connecting said sensing means to said controlled supply means;
said connecting means comprising isolation means in the connection between said sensing means and said controlled supply means, comparison means in electrical series connection with said isolation means and including a comparison reference signal input and a reference signal means, said isolation means providing isolation between said sensing means and said comparison means and limiting the current through said connecting means, said comparison means comparing the signal from said isolation means with a reference signal inserted through said reference signal input to form an error signal proportional to the difference between the desired level of output current and the existing level of output current, said comparison means connecting to said control input means in order to electronically control the regulating means, and means connecting said sensing means to said regulating output means;

high impedance measurement apparatus output means connected to said sensing means and to said voltage supply output means of said controlled supply means, said impedance measurement apparatus output means being adapted to be connected to a load; and measurement indication means connected to said sensing means and said voltage supply output means of said controlled supply means for providing an impedance indication of the load where the output current is electronically controlled to a preset level.

3. High impedance measurement apparatus comprising, in combination:

controlled supply means for supplying an output current which is electronically controlled so as to maintain a preset level of output current;

said controlled supply means comprising a voltage supply means in electrical connection with a regulating means, a voltage supply output means, a regulating output means, and a control input means, and said regulating means electronically controlling the output current to maintain a preset level through an action similar to a voltage dropping action;

sensing means for sensing the output current and providing a signal proportional to the output current;

connecting means connecting said sensing means to said controlled supply means, the signal proportional to the output current electronically controlling said controlled supply means;

said connecting means comprising comparison means including a comparison reference signal input and a reference signal means, said comparison means comparing the signal with a reference signal inserted through said reference signal input to form an error signal proportional to the difference between the desired level of output current and the existing level of output current, said comparison means connecting to said control input means in order to electronically control the regulating means, and means connecting said sensing means to said regulating output means;

high impedance measurement apparatus output means connected to said sensing means and to said voltage supply output means of said controlled supply means, said impedance measurement apparatus output means being adapted to be connected to a load; and measurement indication means connected to said sensing means and said voltage supply output means of said controlled supply means for providing an impedance indication of the load where the output current is electronically controlled to a preset level.

References Cited

UNITED STATES PATENTS

| 2,149,080 | 2/1939 | Wolff | 323—4 XR |
|---|---|---|---|
| 2,891,219 | 6/1959 | Camp | 324—62 |
| 2,912,637 | 11/1959 | Barnes et al. | 323—22 |
| 3,203,223 | 8/1965 | Petrow | 324—62 XR |
| 3,323,043 | 5/1967 | Hekimian | 324—62 XR |

RUDOLPH V. ROLINEC, *Primary Examiner.*

E. E. KUBASIEWICZ, *Assistant Examiner.*

U.S. Cl. X.R.

323—4